United States Patent
Han

(10) Patent No.: US 8,720,961 B2
(45) Date of Patent: May 13, 2014

(54) IMPACT ABSORBING DEVICE FOR VEHICLE

(71) Applicant: Hyundai Motor Company, Seoul (KR)

(72) Inventor: Min Uke Han, Gwangmyung-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/708,774

(22) Filed: Dec. 7, 2012

(65) Prior Publication Data

US 2014/0062106 A1    Mar. 6, 2014

(30) Foreign Application Priority Data

Sep. 3, 2012 (KR) ........................ 10-2012-0097311

(51) Int. Cl.
*B60R 19/34* (2006.01)

(52) U.S. Cl.
USPC ........................................... 293/133

(58) Field of Classification Search
USPC ........................................ 296/102, 132, 133
See application file for complete search history.

(56) References Cited

U.S. PATENT DOCUMENTS

| | | | |
|---|---|---|---|
| 6,808,215 B2 * | 10/2004 | Sakuma et al. | 293/102 |
| 6,857,690 B2 | 2/2005 | Vismara et al. | |
| 7,399,013 B2 * | 7/2008 | Lutke-Bexten et al. | 293/102 |
| 2010/0019518 A1 * | 1/2010 | Stewart et al. | 293/133 |
| 2010/0327613 A1 * | 12/2010 | Arns | 293/149 |
| 2011/0187135 A1 * | 8/2011 | Kano et al. | 293/133 |

FOREIGN PATENT DOCUMENTS

| | | |
|---|---|---|
| JP | 2009-137435 A | 6/2009 |
| JP | 2009-248603 A | 10/2009 |

* cited by examiner

*Primary Examiner* — Lori Lyjak
(74) *Attorney, Agent, or Firm* — Morgan, Lewis & Bockius LLP

(57) ABSTRACT

An impact absorbing device for a vehicle may include a bumper beam disposed to extend in a traverse direction of a vehicle, a side member extending in a longitudinal direction of the vehicle and disposed at a lateral side of the vehicle in the traverse direction thereof, a crash box connecting the bumper beam in the longitudinal direction of the vehicle to the side member, a fender apron member disposed at outer sides of the side member in the traverse direction of the vehicle, a connecting member connecting the fender apron member and the side member, and a side crash box of which a front tip end may be mounted to an outer portion of the bumper beam positioned at an outer direction of the side member in the traverse direction of the vehicle, and of which a rear tip end may be disposed to be spaced apart from the connecting member at a predetermined interval therebetween.

10 Claims, 6 Drawing Sheets

IMPACT ABSORBING DEVICE FOR VEHICLE

CROSS-REFERENCE TO RELATED APPLICATION

The present application claims priority to Korean Patent Application No. 10-2012-0097311 filed on Sep. 3, 2012, the entire contents of which is incorporated herein for all purposes by this reference.

BACKGROUND OF THE INVENTION

1. Field of the Invention

The present invention relates to an impact absorbing device for a vehicle, and more particularly, to an impact absorbing device for a vehicle in which a side crash box is installed outside a crash box.

2. Description of Related Art

In general, an impact absorbing device for a vehicle is mounted on a front side and a rear side in a longitudinal direction of a vehicle so as to contribute to safety of passengers by absorbing impact when a vehicle crashes into a pedestrian, another vehicle, or an object and to simultaneously minimize deformation of a vehicle body.

Referring to FIG. 1, an impact absorbing device for a vehicle in the related art includes bumper beams 1 manufactured in a beam shape to be disposed in a front side and a rear side of a vehicle in a traverse direction of the vehicle and crash boxes 2 mounted at both side portions of the bumper beam 1 in a rear side of the bumper beam 1 in the traverse direction of the vehicle.

A front end of the crash box 2 in the longitudinal direction of the vehicle is mounted to the bumper beam 1 through a stay bracket, and a rear end of the crash box 2 in the longitudinal direction of the vehicle is directly mounted to a side member 3 to be supported.

The side members 3 are arranged at both left and right sides in the traverse direction of the vehicle and extend in the longitudinal direction of the vehicle to constitute a vehicle body.

The crash box 2 is formed in a hollow quadrangular box shape with an empty interior.

When the vehicle including the bumper beam 1 and the crash box 2 in the related art has a front crash, the bumper beam 1 is disposed at the front side, so that the bumper beam 1 preferentially receives crash energy and absorbs the crash energy while being deformed, to reduce the crash energy.

Further, partial crash energy that is not absorbed by the bumper beam 1 is transmitted to the crash box 2 connected with the bumper beam 1, and the crash box 2 also receives the crash energy and absorbs the crash energy while being deformed to reduce the crash energy.

The crash energy that is not absorbed by the impact absorbing device including the bumper beam 1 and the crash box 2 is transmitted to the side member 3 connected with the crash box 2, and the side member 3 also receives the crash energy and absorbs the crash energy while being deformed to reduce the crash energy.

Since the side member 3 is connected with other components constituting the vehicle body, the crash energy transmitted to the side member 3 is also transmitted to other portions of the vehicle body through the side member to be distributed.

However, as illustrated in FIG. 1, when a crash object, such as a barrier 4 is positioned at one side portion of the vehicle, that is, positioned at an outer side of the side member 3 in the traverse direction of the vehicle, and the barrier 4 has a front offset crash by 25% into the vehicle, the barrier 4 does not overlap the side member 3.

Accordingly, the barrier 4 hits both outer portions 1a of the bumper beam 1 to be crashed into a tire part of the vehicle, and the tire is pushed into a vehicle room by the barrier 4 to hit a lower portion of a driver's seat, thereby increasing damages to a driver and a passenger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an impact absorbing device for a vehicle having advantages of effectively distributing crash energy to a side member and other portions of a vehicle body to reduce deformation of the vehicle body and improve safety of a passenger when an outer portion of the side member of a vehicle in a traverse direction of the vehicle has a front offset crash into a person, an object, or another vehicle.

In an aspect of the present invention, an impact absorbing device for a vehicle may include a bumper beam disposed to extend in a traverse direction of a vehicle, a side member extending in a longitudinal direction of the vehicle and disposed at a lateral side of the vehicle in the traverse direction thereof, a crash box connecting the bumper beam in the longitudinal direction of the vehicle to the side member, a fender apron member disposed at outer sides of the side member in the traverse direction of the vehicle, a connecting member connecting the fender apron member and the side member, and a side crash box of which a front tip end is mounted to an outer portion of the bumper beam positioned at an outer direction of the side member in the traverse direction of the vehicle, and of which a rear tip end is disposed to be spaced apart from the connecting member at a predetermined interval therebetween.

The side crash box is aligned toward the side member with a predetermined angle therebetween.

The side crash box is formed in a shape of a hollow box having an empty interior.

The side crash box may include at least a bead formed at a predetermined interval in a longitudinal direction thereof.

The connecting member is formed in a shape of a hollow triangular box having an empty interior.

The connecting member may include a guide bracket facing the rear tip end of the side crash box.

The guide bracket and the rear tip end of the side crash box are spaced with the predetermined interval.

The connecting member may include an opening, wherein the guide bracket may include a flange and the guide bracket is inserted in the opening, the flange of the guide bracket being mounted to the opening.

The predetermined interval is a low speed crash response maintenance interval maintained so as to prevent the rear tip end of the side crash box from being in contact with the guide bracket when the vehicle may have a front offset crash at a low speed.

The predetermined interval is a low speed crash response maintenance interval maintained so as to prevent the rear tip end of the side crash box from being in contact with the guide bracket when the vehicle may have a front offset crash of 15% or lower at a speed of 5 kph or lower.

According to the impact absorbing device for the vehicle according to the exemplary embodiment of the present invention, the side crash boxes are mounted at both outer portions of the bumper beam positioned at outer sides of the side members in the traverse direction to the vehicle, thereby effectively responding to the front offset crash of the vehicle.

That is, the side crash boxes are mounted toward the connecting member between the side member and the fender apron member at both outer portions of the bumper beam, so that, in a case where the vehicle has an offset crash into a person, an object, or another vehicle at both outer portions of the bumper beam, the side crash boxes receive crash energy and are pushed toward the connecting member to be deformed, and primarily absorbs the crash energy during the process, thereby reducing the crash energy.

Further, the crash energy fails to be absorbed in the side crash boxes is transmitted to the side member and the fender apron member through the connecting member to be distributed to other portions of the vehicle body, so that it is possible to effectively reduce crash damage of the vehicle body due to concentration of the crash energy.

In addition, the crash energy is effectively distributed to other portions of the vehicle body through the side crash boxes as described above, so that an amount of transmission of the crash energy transmitted to a vehicle room is decreased, thereby reducing crash injury to a passenger.

Moreover, since the side crash boxes are mounted to be spaced from the connecting member at a predetermined interval, only the bumper beam is deformed while the crash energy is completely absorbed by the bumper beam, and the side crash boxes maintain their original shapes without crashing into the connecting member in a case where both outer portions of the bumper beam of the vehicle has a front offset crash at a lower speed.

Accordingly, it is sufficient to repair only the deformed bumper beam, so that repair expenses are not increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
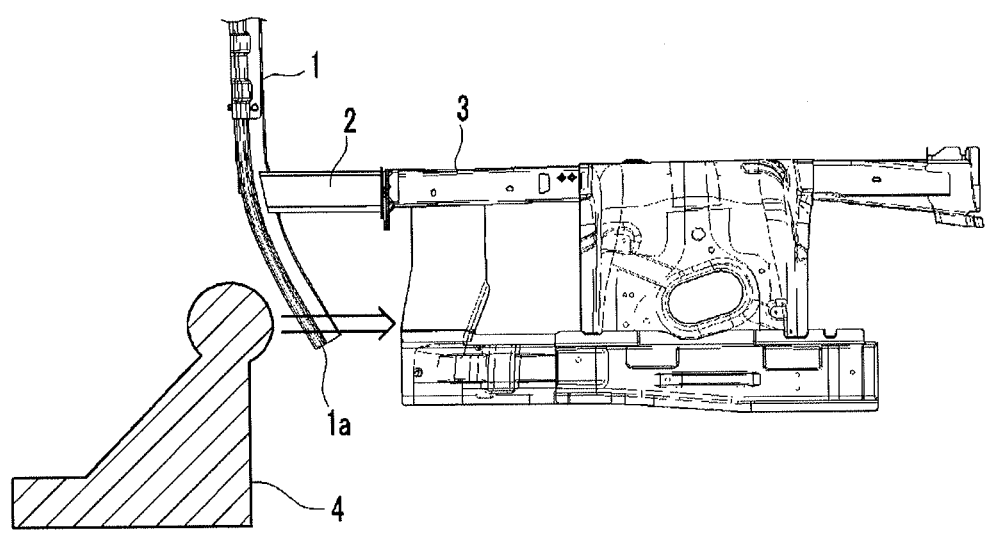
FIG. 1 is a perspective view of an impact absorbing device for a vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 2:
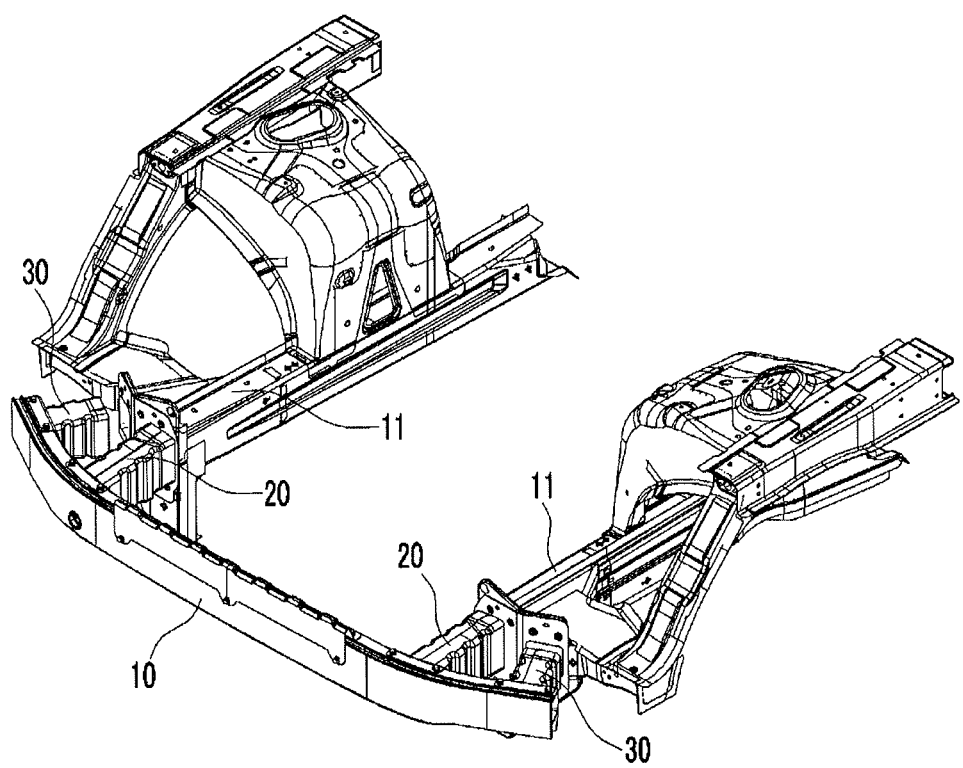
FIG. 2 is a perspective view of a front vehicle body of a vehicle in which an impact absorbing device according to an exemplary embodiment of the present invention is installed.

Referring to FIG. 2, an impact absorbing device for a vehicle according to an exemplary embodiment of the present invention includes a bumper beam 10 extending in a traverse direction of a vehicle, crash boxes 20 for connecting both side portions of the bumper beam 10 in the traverse direction of the vehicle to side members 11 constituting a vehicle body, and side crash boxes 30 installed at both outer portions of the bumper beam 10 in outer sides of the side members 11 in the traverse direction of the vehicle.

Figure 3:
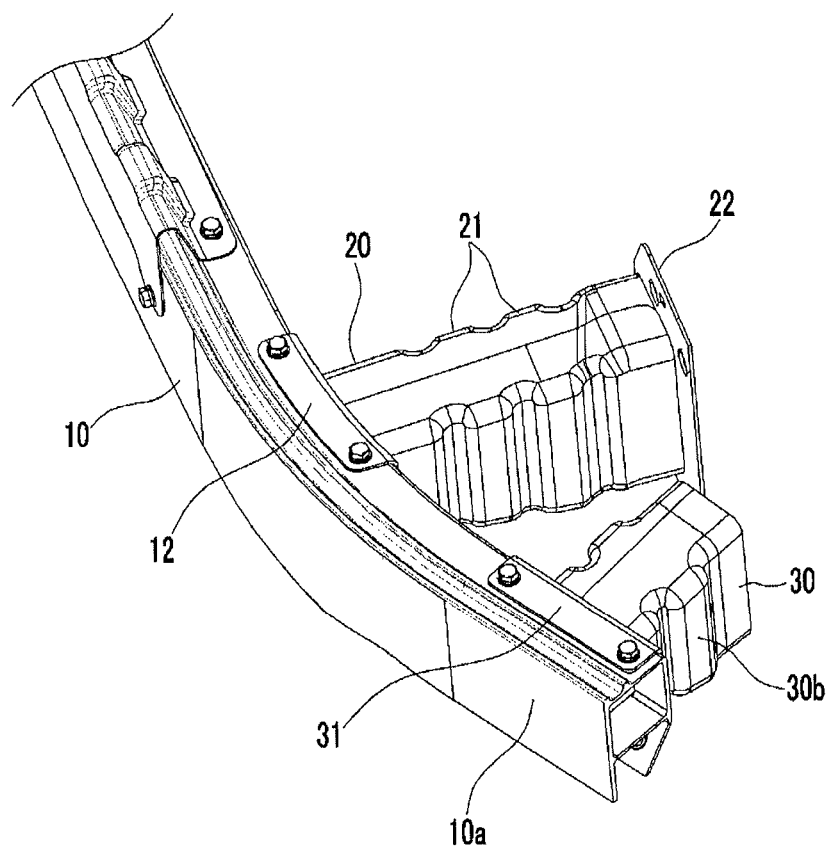
FIG. 3 is a perspective view of a state in which a side crash box according to an exemplary embodiment of the present invention is mounted to a bumper beam.

Referring to FIG. 3, the bumper beam 10 is formed in a beam shape having a hollow section with an empty interior, and the hollow section extends from one tip end to the other tip end in a longitudinal direction of the bumper beam 10.

The hollow section of the bumper beam 10 generally has a quadrangular shape, but may have other shapes.

The front tip end of the crash box 20 is mounted to a rear surface of the bumper beam 10 in the longitudinal direction of the vehicle through a stay bracket 12.

The crash box 20 is formed in a shape of a hollow quadrangular box having an empty interior, and includes a plurality of beads 21 for reinforcing strength in a longitudinal direction of the crash box 20.

A mounting bracket 22 is attached to a rear tip end of the crash box 20 and the mounting bracket 22 is mounted to the side member 11, so that the bumper beam 10 is mounted to the side member 11 through the crash box 20 and the mounting bracket 22 to be supported.

Front tip ends of the side crash boxes 30 are mounted to both outer portions 10a of the bumper beam 10 positioned at outer sides of the side members 11 in the traverse direction of the vehicle in the bumper beam 10 through stay brackets 31.

The side crash box 30 has a shape of a hollow box having an empty interior, and includes a plurality of beads 30b for reinforcing strength in a longitudinal direction of the side crash box 30.

The side crash box 30 is obliquely mounted toward the rear side of the vehicle in the longitudinal direction of the vehicle at a predetermined angle, contrary to the crash box 20.

Figure 4:
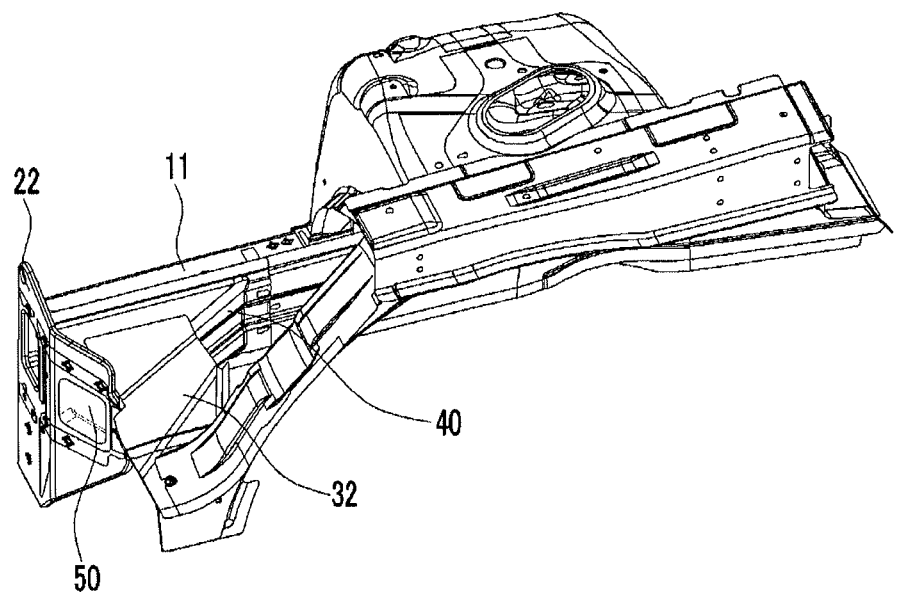
FIG. 4 is a perspective view of a mounted state of a connecting member connecting a side member and a fender apron member according to an exemplary embodiment of the present invention.

Referring to FIG. 4, the fender apron member 32 is disposed at an outer side of the side member 11 in the traverse direction of the vehicle.

A connecting member 40 is attached to one side surface of the side member 11 facing the fender apron member 32, and the fender apron member 32 is connected to the connecting member 40.

Accordingly, the side member 11 and the fender apron member 32 are connected to each other through the connecting member 40.

The connecting member 40 is formed in a shape of a hollow triangular box having an empty interior, and a flange extends outwardly along an edge of the triangular box shape, so that the flange is attached to the side member 11 by a welding method and the like.

A tip end of the fender apron member 32 is connected to an inclined plane of the triangular box shape while being fitted to the inclined plane of the triangular box shape, to be integrally attached.

A guide bracket 50 is attached to a facing surface of the triangular box shape facing the side crash box 30.

The guide bracket 50 is generally shaped like a quadrangular bracket to be inserted inside the triangular box to be mounted.

That is, an opening 33 is formed at a facing surface of the connecting member 40 and a flange 55 is formed along an edge of the guide bracket 50, so that the flange 55 may be attached to an edge of the opening 33 by welding and the like in a state where the guide bracket 5 is inserted through the opening 33.

The guide bracket 50 comes into close contact with the side crash box 30 when the side crash box 30 is pushed toward the connecting member 40 to serve to transmit crash energy.

Figure 5:
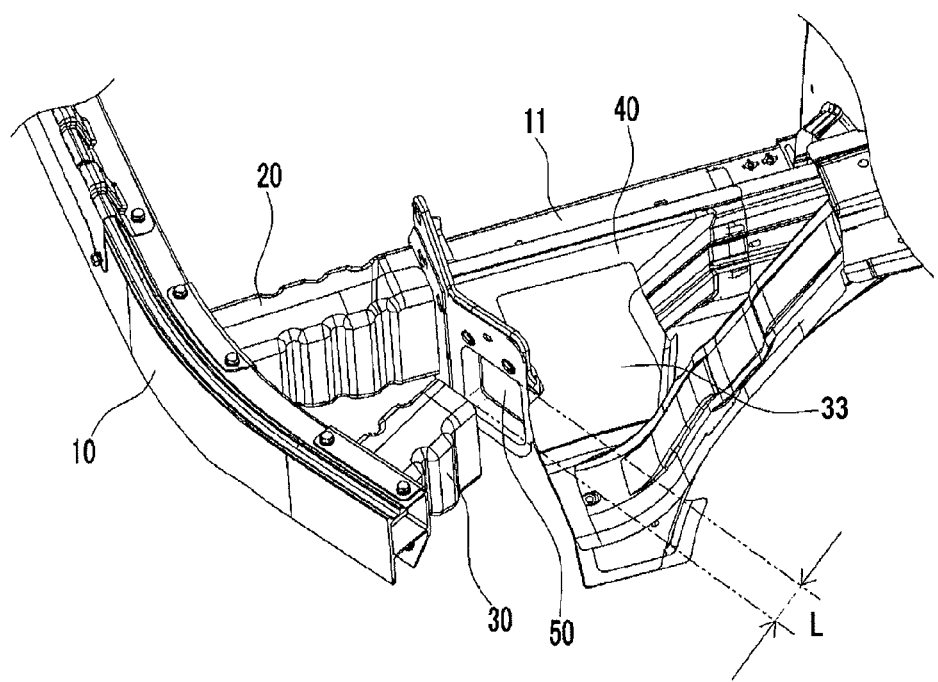
FIG. 5 is a perspective view of a mounted state of a side crash box and a connecting member according to an exemplary embodiment of the present invention.
Figure 6:
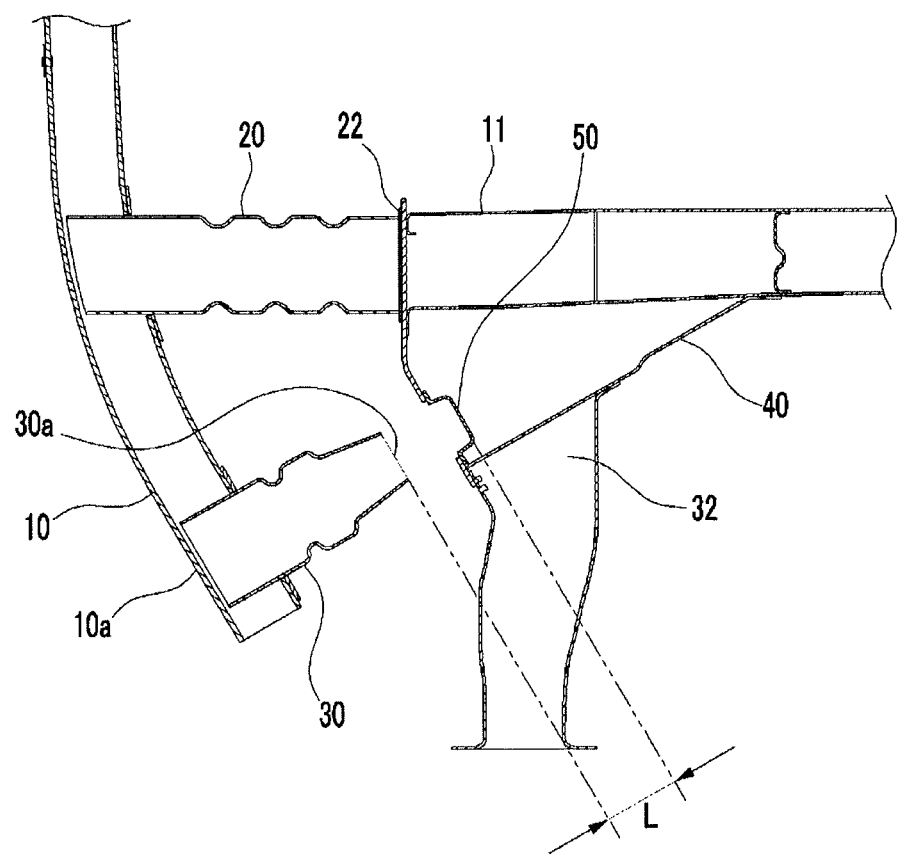
FIG. 6 is a cross-sectional view of FIG. 5.

Referring to FIGS. 5 and 6, a front tip end of the side crash box 30 is mounted to rear surfaces of the both outer portions 10*a* of the bumper beam 10 so as to be spaced apart from the guide bracket 50 at a predetermined interval L in a state where a rear tip end 30*a* of the side crash box 30 faces the guide bracket 50.

The predetermined interval L is a low speed crash response maintenance interval L for preventing the side crash box 30 from hitting the guide bracket when the vehicle has a front offset crash at a low speed, for example, the vehicle has an offset crash by 15% or less at a front side at a speed of 5 kph or lower.

That is, when the vehicle has the offset crash at a low speed, only the bumper beam 10 receives the crash energy to absorb the crash energy while being deformed, and the side crash box 30 is positioned within the low speed crash response maintenance interval without being in contact with the guide bracket 50.

Accordingly, when the vehicle has the front offset crash at the low speed, the side crash box 30 is not in contact with the guide bracket 50 so that the side crash box 30 is not damaged.

Accordingly, it is not necessary to repair the side crash box after the low speed offset crash of the vehicle and it is sufficient to repair only the bumper beam, thereby reducing repair expenses of the vehicle.

In the meantime, for example, when the vehicle has the front offset crash by 25% (small overlap), the side crash box 30 receives the crash energy and moves to the rear side of the vehicle to hit the guide bracket 50, and the side crash box 30 partially absorbs the crash energy while being deformed due to the crash energy during the process, thereby reducing the crash energy.

Further, the crash energy that is not absorbed by the side crash box 30 is transmitted to the connecting member 40 through the guide bracket 50.

Since the connecting member 40 connects the side member 11 and the fender apron member 32, the crash energy transmitted to the connecting member 40 is effectively distributed to other portions of the vehicle body through the side member 11 and the fender apron member 32, thereby improving crash response performance of the impact absorbing device according to the exemplary embodiment of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An impact absorbing device for a vehicle, comprising:
    a bumper beam disposed to extend in a traverse direction of a vehicle;
    a side member extending in a longitudinal direction of the vehicle and disposed at a lateral side of the vehicle in the traverse direction thereof;
    a crash box connecting the bumper beam in the longitudinal direction of the vehicle to the side member;
    a fender apron member disposed at outer sides of the side member in the traverse direction of the vehicle;
    a connecting member connecting the fender apron member and the side member; and
    a side crash box of which a front tip end is mounted to an outer portion of the bumper beam positioned at an outer direction of the side member in the traverse direction of the vehicle, and of which a rear tip end is disposed to be spaced apart from the connecting member at a predetermined interval therebetween.

2. The impact absorbing device of claim 1, wherein the side crash box is aligned toward the side member with a predetermined angle therebetween.

3. The impact absorbing device of claim 1, wherein the side crash box is formed in a shape of a hollow box having an empty interior.

4. The impact absorbing device of claim 3, wherein the side crash box includes at least a bead formed at a predetermined interval in a longitudinal direction thereof.

5. The impact absorbing device of claim 1, wherein the connecting member is formed in a shape of a hollow triangular box having an empty interior.

6. The impact absorbing device of claim 5, wherein the connecting member includes a guide bracket facing the rear tip end of the side crash box.

7. The impact absorbing device of claim 6, wherein the guide bracket and the rear tip end of the side crash box are spaced with the predetermined interval.

8. The impact absorbing device of claim 6,
    wherein the connecting member includes an opening, and
    wherein the guide bracket includes a flange and the guide bracket is inserted in the opening, the flange of the guide bracket being mounted to the opening.

9. The impact absorbing device of claim 1, wherein the predetermined interval is a low speed crash response maintenance interval maintained so as to prevent the rear tip end of the side crash box from being in contact with the guide bracket when the vehicle has a front offset crash at a low speed.

10. The impact absorbing device of claim 1, wherein the predetermined interval is a low speed crash response maintenance interval maintained so as to prevent the rear tip end of the side crash box from being in contact with the guide bracket when the vehicle has a front offset crash of 15% or lower at a speed of 5 kph or lower.

* * * * *